(12) United States Patent
Shah et al.

(10) Patent No.: US 7,609,703 B2
(45) Date of Patent: Oct. 27, 2009

(54) GROUP COMMUNICATION SYSTEM AND METHOD

(75) Inventors: Mehul A. Shah, Palo Alto, CA (US); Marcos K. Aguilera, Palo Alto, CA (US); Christos Karamanolis, Los Gatos, CA (US); Arif Merchant, Palo Alto, CA (US); Alistar Veitch, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 11/522,151

(22) Filed: Sep. 15, 2006

(65) Prior Publication Data

US 2008/0069098 A1 Mar. 20, 2008

(51) Int. Cl.
*H04L 12/28* (2006.01)
(52) U.S. Cl. .................. 370/400; 370/395.72; 709/214
(58) Field of Classification Search ........................ None
See application file for complete search history.

(56) References Cited

U.S. PATENT DOCUMENTS

| | | | |
|---|---|---|---|
| 6,457,021 B1 | 9/2002 | Berkowitz | |
| 6,467,011 B2 | 10/2002 | Scardamalia | |
| 6,487,606 B1 | 11/2002 | Minyard et al. | |
| 6,658,490 B1 * | 12/2003 | Williams et al. | ............ 709/330 |
| 6,704,801 B1 | 3/2004 | Minyard | |
| 6,771,646 B1 * | 8/2004 | Sarkissian et al. | ........... 370/392 |
| 6,779,038 B1 | 8/2004 | Minyard | |
| 6,816,947 B1 | 11/2004 | Huffman | |
| 6,839,751 B1 * | 1/2005 | Dietz et al. | ................. 709/224 |
| 6,914,910 B1 | 7/2005 | Van Renesse et al. | |
| 6,940,870 B2 | 9/2005 | Hamlin | |
| 6,959,323 B1 | 10/2005 | Tzeng et al. | |
| 6,990,516 B2 | 1/2006 | Chen | |
| 7,295,561 B1 * | 11/2007 | Yao et al. | .................... 370/400 |
| 7,454,478 B1 * | 11/2008 | Rosselli et al. | .............. 709/214 |
| 2007/0110055 A1 * | 5/2007 | Fischer et al. | ............... 370/389 |
| 2007/0288587 A1 | 12/2007 | Aguilera | |

OTHER PUBLICATIONS

Birman, K.P., The Process Group Approach to Reliable Distributed Computing, Communications of the ACM, vol. 36, No. 12 (Dec. 1993), pp. 37-53, 103.

* cited by examiner

*Primary Examiner*—Phirin Sam

(57) ABSTRACT

Provided is a system and method for directing group communication in a system environment that has a plurality of discrete application nodes networked with at least one discrete memory node, establishing a shared memory providing a passive message queue. A code library permits an application node member of a group to assemble a message selected from the group of send, join, leave, or read. The send, join and leave messages permit a first application node to add a message to the queue for all members of a group including the first application node at the time the message was added. The instruction set permitting the addition of the message is executed atomically.

19 Claims, 8 Drawing Sheets

GROUP COMMUNICATION SYSTEM AND METHOD

FIELD OF THE INVENTION

The present invention relates generally to the field of distributed computer systems, methods for controlling transactions in a distributed system environment, and specifically to group communication between members of the distributed computer system.

BACKGROUND

Networked computer systems are becoming increasingly popular as they permit different computers to share information. A node is generally a device that is connected as part of a computer network. Not to the exclusion of other devices, as used herein a node is generally understood and appreciated to be a computer.

Designing distributed infrastructure applications such as, for example, memory systems, file systems and group communication services is difficult for a variety of reasons. These for example include issues of consistency of the distributed state, the reliability and availability of data in the face of node, link or other component failure, and scalability.

Typically a rather fundamental aspect in most networks and especially with distributed infrastructure applications is the ability for nodes to share in group communication. Informally speaking, group communication generally refers to two services, reliable totally ordered multicast and group membership agreement—which are typically implemented as a single service, as their properties are related.

To further understand the utility of group communication, consider a brokerage or trading system. Brokerage and trading systems typically involve a number of distributed applications and/or systems that must act in concert to execute each and every trade. For example, when conducting a trade it may be necessary to check prices of an equity from a rapidly changing database, check currency rates from another, draw funds from an account, and place an order at the trading floor, each of which is an independent action, but actions which must be coordinated to successfully conclude the trade. Further, once initiated, these actions must occur reliably, even if the broker's computer or other element of the network system fails partway through the trade execution. A failure to act in such a reliable fashion could, for example, result in the trade occurring without drawing funds from the buyers account. A key element to the reliability of such a system to conduct the trade execution is to ensure that messages between the interacting applications are delivered reliably and in the proper order. This is a natural setting for a group communication system.

Such a need for coordinated group communication is not limited to complex systems. A message board as may be used by students, colleagues, hobbyists, or other individuals desiring to share information. Generally in such settings it is desired that all users in the group see all the messages posted to the group (during the time they are members of the group), and that the messages are seen in the same order by all members of the group so that replies make sense and appear in proper context.

In theory, a group communication service operates to ensure that all correct members of a group (intended members and members that have not crashed or been disconnected) are aware of and in agreement with all membership changes that happen within the group. For a given group, a current agreed upon identity of the group membership may be called a view—i.e., a view of the group membership at that moment, which will exist until new members join or current members leave.

When a new member joins a group, and thus establishes a new view, it is desirable that the member receive each and every message sent to the group from the time of its joining. It is also highly desirable for all members of the group to receive the same messages in the same total order. That is, through the communication system, each member receives its messages in exactly the same order as every other member of the same group or subset of the group.

Total order among messages means that each message in a set of messages either comes before or after any other message in the set. For example, if group members X, A, and W each broadcast messages M(X), M(A), and M(W) respectively, then the group communication system may choose any total order in which to deliver this set of messages. One such order is M(X) before M(A) before M(W); thus, all members will receive the messages in that order.

Various attempts to provide group communication systems and services have been undertaken, which are generally large and complex. Frequently these systems rely on one dedicated node as a gate keeper, either to order the messages or through which all messages must pass. In other systems, the node sending a message is responsible for coordinating the delivery to every other node member of the group, which of course imposes additional overhead and tracking upon the sending node and may interrupt the activities of the receiving node. Gate keepers and single access points impose significant constraints upon a group communication system in terms of scalability and reliability.

A significant aspect in attempting to implement a group communication system or method is to ensure that, (A) group members receive the same messages, despite a lossy network, and (B) group members receive messages in the same order, despite concurrent sending of messages. Should some group members receive only some messages or messages in a different order, system instability, data corruption, and/or unintended system operations are likely to occur.

It is also generally desirable for members of the group to add and read only complete messages. Consider a group message such as "Sell XYZ stock and buy ABC stock." Should only the first part of the message "Sell XYZ stock" be transmitted to the group, or one or more group members only read the first part of the message, the failure to buy ABC stock may well have negative consequences. It is therefore often extremely important to control write operations in such a way that other nodes do not inadvertently receive partial data or data believed to be current when in fact the write operation is still ongoing.

Hence, there is a need for a group communication system and method for that overcomes one or more of the drawbacks identified above.

DETAILED DESCRIPTION

The present disclosure advances the art by providing in at least one embodiment a group communication system and method that leverages a networked transactional shared-memory system (TSMS).

Before proceeding with the detailed description, it is to be appreciated that the present teaching is by way of example only, not by limitation. The concepts herein are not limited to use or application with a specific system or method for a group communication network transactional shared memory environment and/or a control process for directing group communication in a distributed system environment. Thus, although the instrumentalities described herein are for the convenience of explanation, shown and described with respect to exemplary embodiments, it will be appreciated that the principles herein may be applied equally in other types of systems and methods involving distributed systems group communication.

Figure 1:
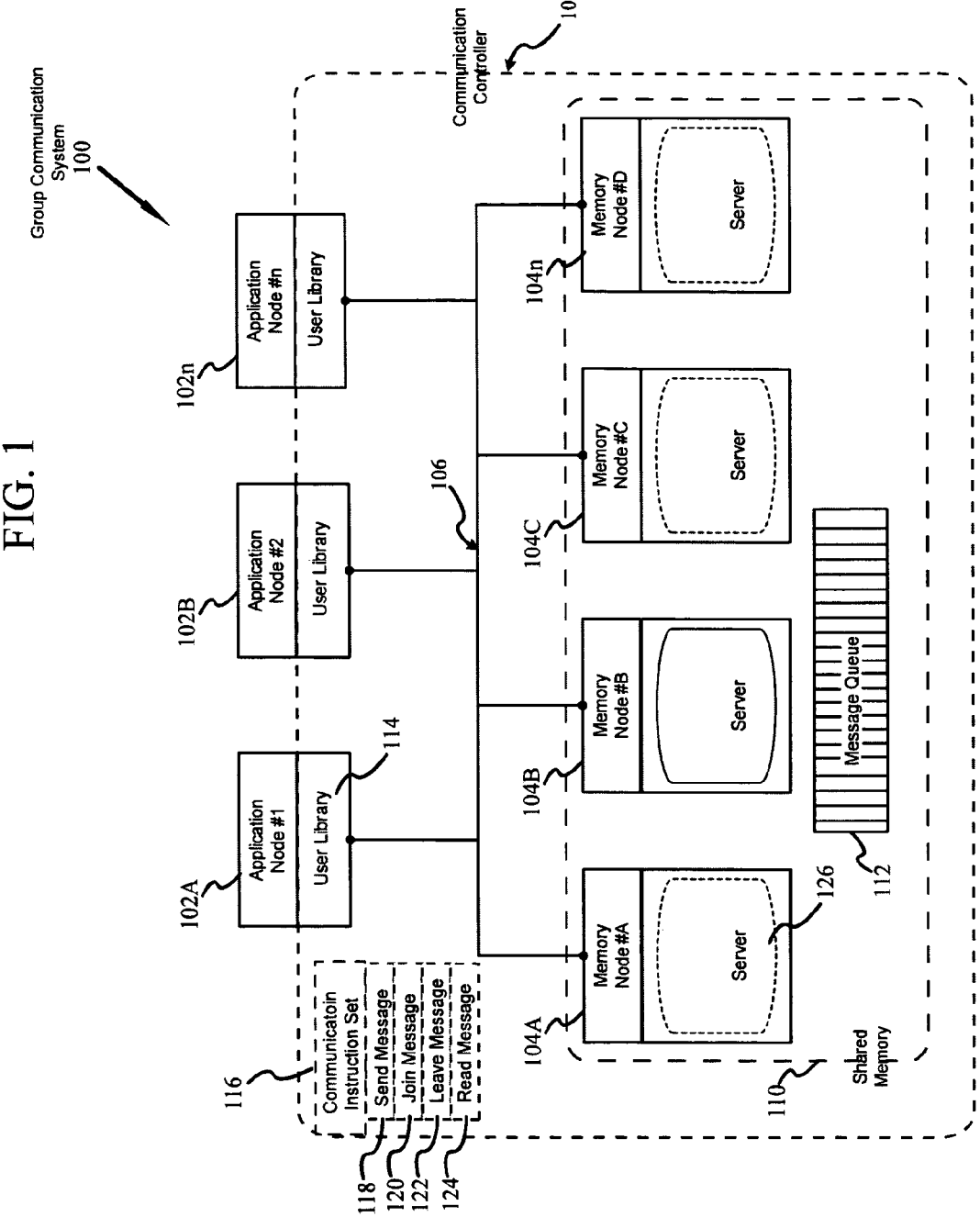
FIG. 1 is a block diagram of a group communication system in accordance with an embodiment.

FIG. 1 is a high level block diagram of a group communication system ("GCS") 100 in accordance with at least one embodiment. As shown, GCS 100 generally includes a plurality of application nodes 102 (of which 102A~102n are exemplary) and at least one memory node 104 interconnected by a network 106 and a communication controller 108.

At least one memory node 104 provides a shared memory 110 to the application nodes 102A~102n and more specifically, within the shared memory is provided a message queue 112. Although such a system may be employed with a single memory node 104, in at least one alternative embodiment there are plurality of memory nodes such as 104A~104n which collectively provide the shared memory 110 and specifically the message queue 112.

In at least one embodiment, application nodes 102 are understood and appreciated to be systems such as might be used by a human operator or by some software system. More specifically, application nodes 102 are systems which are capable of, and intended for use in, processing applications as may be desired by a user or by some software system. Application nodes 102 may be commercially available computer systems such as desktop or laptop systems provided by HP or other computer system providers. In addition, in at least one embodiment, application nodes 102 are processes or threads within a computer, and are therefore not individual computers themselves. With respect to the figures, application nodes 104A~104n have been illustrated distinctly for ease of illustration and discussion.

The memory node 104 or nodes 104a~104n, as desired by varying embodiments, are network attached devices providing random access memory (RAM) and/or disk space (for storage and as virtual RAM) and/or some other form of storage such as tapes, MEMS, optical disks or the like, for use by the application nodes 102 in processing applications. Memory node(s) 104 may also be commercially available computer systems such as desktop or laptop systems as provided by HP or other computer system providers, and combinations thereof. Typically, the memory nodes will be equipped with larger amounts of RAM and/or disk space than the application nodes 102. Memory nodes may also be more specialized devices such as network disk drives or disk drive arrays, (e.g., RAID), high speed tape, MRAM systems or other devices, and combinations thereof.

Moreover, whereas in a shared memory system or a distributed memory system the networked nodes are not differentiated to be either application nodes or memory nodes, as implied by the figures, in at least one embodiment of GCS 100, the memory node(s) 104 and application nodes 102 are distinct. In other words, in at least one embodiment the application nodes 102 and memory node(s) 104 are discrete elements. In certain embodiments, at least some application nodes 102 and memory nodes 104 may be co-located such as in a rack or even within the same system box. However, it is understood and appreciated that at least one application node 102 is logically separate from at least one other memory node 104. Further, in at least one embodiment at least one application node 102 is physically separate from at least one memory node 104.

The communication controller 108 is operable to direct group communication transactions between the plurality of discrete application nodes 102 using the shared memory 110 utilizing atomic transactions. Atomic transactions are guaranteed to have either of two outcomes—either complete execution (commit) or leave no trace of execution (abort), and when multiple processes attempt to perform conflicting atomic transactions simultaneously, their atomic nature guarantees that the transactions that succeed are serializable, meaning that they appear to execute one after the other without intermingling. Guaranteeing atomic transactions frees the programmer from concerns over partial updates occurring, which could lead to corruption of data and/or an errant view of the data. Moreover, to interact atomically is to interact via atomic transactions, such that each interaction either is or is not completely successful.

In at least one embodiment, the communication controller 108 is implemented as a method stored on a computer-readable medium as a computer program. The form of the medium and the language of the program are understood to be appropriate for the application nodes 102 and memory node(s) 104. As such, the communication controller advantageously permits each application node 102 to act autonomously without requiring a single physical centralized server or gate keeper to oversee and direct the actions of group communication.

In other words, GCS 100 permits group communication to occur in a highly advantageous way. Specifically, in at least one embodiment messages are sent and read by individual application nodes without active imposition upon one another. Further the message queue 112 ensures a total order for all messages such that all messages will be received in the same order by all members of the group. In addition, the members of the group are permitted to read from the message queue 112 at a time of convenience of their choosing. Further still, the message queue 112 can be implemented in a distributed shared memory 110.

When executed within the network, the computer program will establish the communication controller 108 and perform the method of group communication in the shared memory environment. Specifically, in at least one method of implementation, the communication controller 108 provides each application node 102 with a code library 114 that is operable to permit each application node 102 to assemble a message communication instruction set 116 for propagation to the message queue 112 provided by at least one memory node 104.

The communication instruction set 116 includes instruction subsets selected from the group consisting of a send message subset 118, a join message subset 120, a leave message subset 122, and a read message subset 124. In at least one embodiment, the communication instruction set 116 may include one or more subsets of a single subset type. In an alternative embodiment, the communication instruction set 116 may include combinations of different subset types.

With respect to the method of at least one embodiment, the send message subset 118 permits an application node, i.e., a first application node, to add a message to the queue 112 for all members of a group of application nodes including the first application node, i.e., the latest view of the group.

The join message subset 120 permits an application node, i.e., a first application node, to add a join message to the queue 112 for all members of the group. With the addition of a new member, the latest view of the group will change so as to include the new member. In one embodiment, the join message is sent by the application joining the group. In an alternative embodiment, the join message may also be sent by a current member of the group on behalf of an application node that is joining the group.

The read message subset 124 permits an application node, i.e., a second application node, to read from the queue 112 any messages added to the queue by the first application node member of a group including the second application node. In other words, an application node may read from the queue 112 any messages posted in a view that includes the reading application node. It is appreciated that in acting in the role of a second application node reading from the queue, the second application node may indeed read a message which the application node itself earlier posted acting in the role of a first application node.

The leave message subset 122 permits an application node to add a leave message to the queue 112 for all members of a group of application nodes from which an application node is leaving. The leave message may be added by the leaving application node itself or on behalf of the leaving application by another member of the group. In response to the departure of an application node from the group, yet another view of the group results to reflect the new group membership.

To summarize the issue of view, the group membership may include application nodes A, B, C and D (V1={A, B, C, D}). Upon the joining of application node E, a new view results (V2={A, B, C, D, E}). Upon the leaving of application node B, yet another view results (V3={A, C, D, E}).

Moreover, to send a message an application node must be a member of the latest group view. Therefore, if not a member of the latest view, a join message must be added so as to provide a new group view which includes the application node desiring to send a message. Likewise, an application node is only permitted to read messages that were added in a view of the group which included the reading application node. In other words, a member of a view is permitted to send a message that can be read by every other member of that view (including itself), every member has an opportunity to receive every message sent in a view to which it belongs, and the total order of the messages as read is the same for all members of the view.

In addition to providing the application nodes 102 with the code library 114, the communication controller 108 also establishes a server 126 application upon the at least one memory node 104 to collectively provide the shared memory 110, and more specifically, the passive message queue 112. For the sake of simplicity, in at least one embodiment the server 126 may simply be considered the memory node 104.

In at least one embodiment, the memory node(s) 104 are passive entities that simply wait for server requests from the application nodes 102. Because of their simplicity, the memory node(s) 104 can easily be made fault tolerant by using existing replication, disk logging and disk imaging systems and methods.

Simply stated, communication controller 108 establishes a message communication framework within the network wherein each application node member of a group can post messages to the message queue 112. The message queue 112 is a passive entity, such as for example a traditional blackboard upon which a person may choose to write a message for others to read. The communication controller 108 further permits other application node members of the group to query the message queue 112 at intervals of their choosing and receive any new messages posted for their group.

Moreover, in at least one embodiment, the communication controller 108 permits each application node 102 to address the memory queue 112 established by the at least one memory node, to either add messages to the queue or to read messages from the queue. In at least one embodiment, the message queue 112 spans at least two different memory nodes 104, e.g., memory nodes 104A~104C; however, such a spanning condition is entirely transparent to application nodes 102.

In at least one embodiment the shared memory 110 is presented as a linear memory address space. In one embodiment the size of the shared memory 110 is of such magnitude that the memory queue 112 is a linear queue. In at least one alternative embodiment, regardless of the size of the shared memory 110, the memory queue 112 is a circular memory queue.

Figure 2:
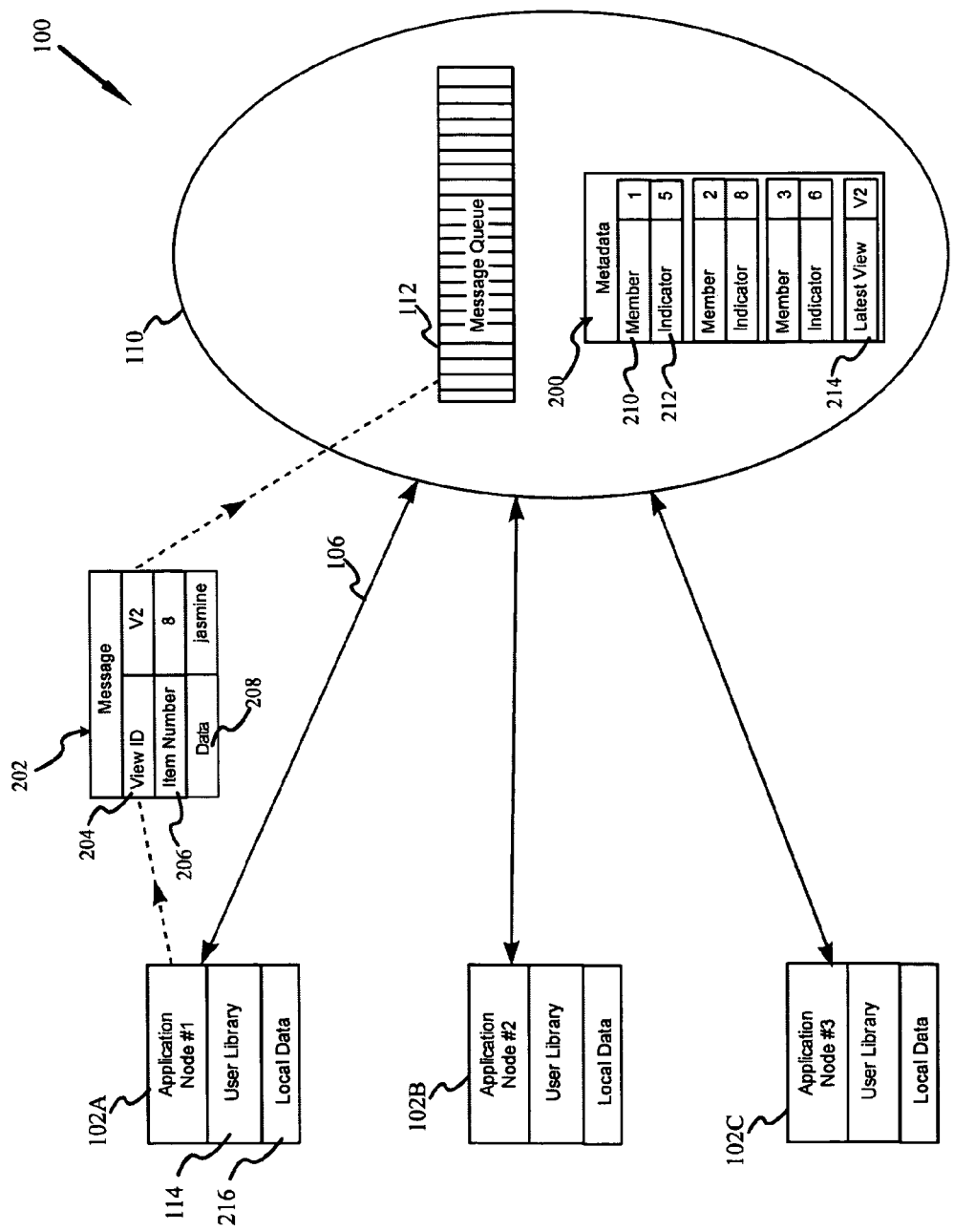
FIG. 2 is an alternative conceptual view of the group communication system shown in FIG. 1 in accordance with an embodiment.

FIG. 2 provides a conceptual view of the GCS 100 including three application nodes 102A~102C interconnected by a network 106 to a shared memory 110. Each application node 102A~102C has a code library 114 and a local data store 216 wherein the application node may store information such as, for example, the latest view id and the item number of the last message read from the message queue 112.

Within the shared memory 110 is established the message queue 112, and group membership metadata 200. The shared memory 110 and more specifically, the message queue 112 and metadata 200 may be provided by a single memory node 104 or a plurality of memory nodes, see FIG. 1. Such back end configuration is transparent to the application nodes 102A~102C, which merely perceive a contiguous entity of shared memory 112 providing the message queue 112 and metadata 200.

In at least one embodiment, for each message added to the queue, e.g., message 202, there is a view id 204, identifying the view of the group membership at the time the message was added, a unique sequential item number 206, and the message data 208. The sequential item number 206 aids in establishing the total order of the message list and the view id 204 acts to identify the view of the group membership at the time the message was added.

In at least one embodiment, metadata 200 contains information about the members of the group engaged in communication. More specifically there is a data element 210 uniquely identifying each member of the group, and an indicator 212 for each group member approximating the lower bound of the last message item number 206 read from the queue 112. In addition, the metadata 200 may provide the latest view id 214 for the latest view of the group membership.

As is further described below, at periodic intervals the application node member will update the metadata 200 to reflect a new indicator of the last message read. In at least one embodiment, the metadata is always current, that is it always reflects the latest view. This property is achieved by frequently updating the metadata to reflect the last known state.

The metadata 200 advantageously permits simplified garbage collection (also known as cleanup operation) for read messages from the list. At periodic intervals, the cleanup operator reviews the metadata 200 and specifically, the indicators 212 determine the lower bound on the last message read by all application node members of the group. With the lower bound identified, the cleanup operator then acts to remove all messages from the queue with item numbers less than the determined lower bound. In such a manner, the cleanup operation can advantageously be performed without polling each group member directly.

Figure 3:
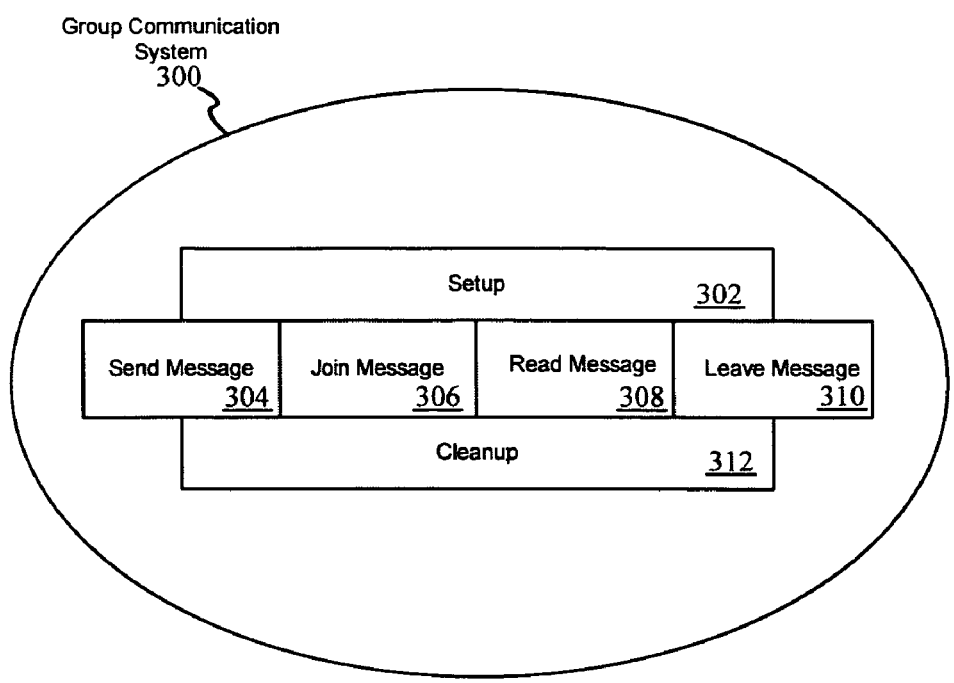
FIG. 3 is a block diagram of a computer program providing routines for setup, send, join, leave, read, and cleanup in accordance with at least one embodiment.

FIG. 3 is a high level block diagram of the computer program architecture of a group communication program 300 in accordance with at least one embodiment. As shown for at least one embodiment, the group communication program 300 includes a setup routine 302, a send message routine 304, a join message routine 306, a read message routine 308, a leave message routine 310, and a cleanup routine 312. Moreover, the group communication program 300 is operable to permit application nodes 102 participating in a group to communicate in a structured manner that ensures both total order of all messages and that each group member has a guaranteed opportunity to receive all intended messages.

The setup routine 302 is operable to establish within the shared memory 110 a queue 112 and group metadata 200 (see FIG. 2), and for establishing within each application node 102 a last message read indicator. In at least one embodiment, such a local last message read indicator is established within the local data 216, see FIG. 2. The setup routine 302 further provides the code library to the application nodes 102 which permits the application nodes 102 to execute at least the send message routine 304, join message routine 306, read message routine 308, and leave message routine 310. In at least one embodiment, such as for example where the message queue 112 is a circular message queue, a cleanup routine 312 is also provided which as indicated above will operate periodically to remove messages from the message queue 112 that have been read by all members of the group.

In at least one embodiment, the group communication system is employed in a network environment having transactional shared memory. Such a system is set forth and described in U.S. patent application Ser. No. 11/450,987, U.S. Publication No. 2007/0288587, entitled "Transactional Shared Memory System and Method of Control", filed Jun. 12, 2006, the disclosure of which is incorporated herein by reference. Core aspects of such an environment are briefly described below to facilitate a more detailed description of performing message communication within such an environment.

Figure 4:
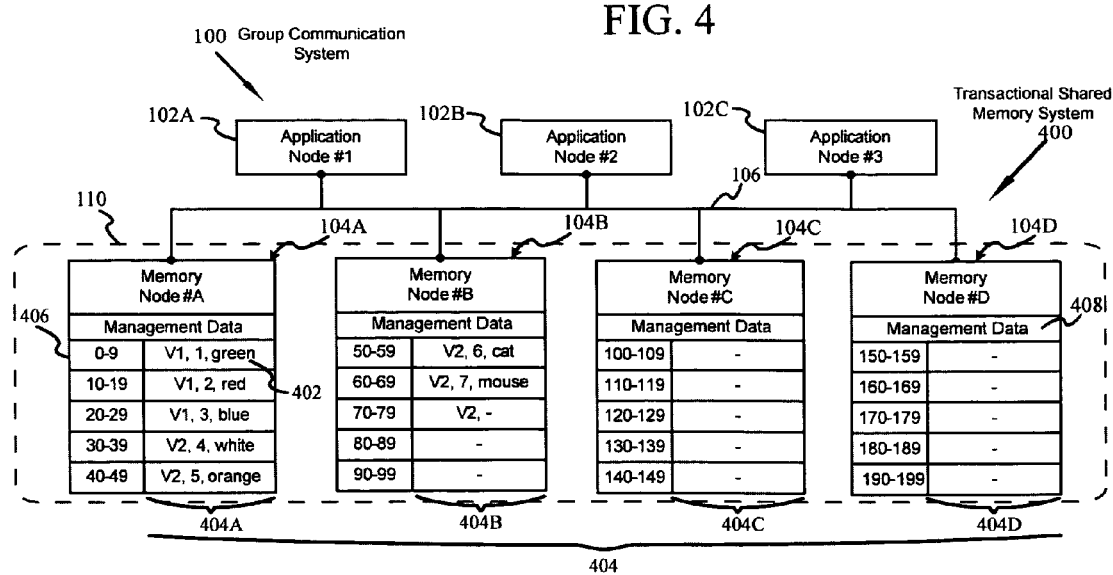
FIG. 4 is a yet another conceptual view of the group communication system shown in FIG. 1 further illustrating a transactional shared memory system supporting the group communication system in accordance with an embodiment.

FIG. 4 provides a refined conceptual view of the GCS 100 shown in FIG. 1, wherein the system is a transactional shared memory system "TSMS" 400 including three application nodes 102A~102C interconnected by network 106 to four memory nodes 104A~104D. It is of course understood and appreciated that TSMS 400 may include many more nodes; however, FIG. 4 has been rendered for ease of description and illustration.

As shown, each memory node 104 provides a sequence of raw or uninterrupted words 402 of a predetermined standard size, such as for example eight, thirty-two or sixty-four bits, or five hundred twelve bytes. In at least one embodiment, the word spaces have eight bits (one byte). Each memory node 104 also has an allocation space for management data 408. It is here that management data, such as the data needed by or used by the server 126 of the communication controller 108, resides on each memory node 104.

Words 402 are organized as an address space 404, and in at least one embodiment, this is a linear address space which is an integer range. It is understood and appreciated that there are different ways to organize the address space 404. FIG. 4 illustrates at least one organizational strategy, however it is understood and appreciated that such an example is not a limitation. Within TSMS 400, data can be globally referenced by an address pair, such as for example, (mem-id, address), where "mem-id" is the identifier of a specific memory node 104 (e.g., a specific memory node host name or node identifier) and "address" is a number 406 within the address space (e.g., address space 402A) of the specified memory node 104 (e.g., memory node 104A). The memory queue shown and described above is established within the address space 402. In at least one embodiment, such as for example where the shared memory is provided as a linear address space, the memory node identifier is determined from the memory address range 406.

With respect to FIG. 4, exemplary data is provided in some words 402. For the sake of example, this exemplary data includes a view id "Vn", an item number and message text. This data is depicted as human readable text for ease of illustration and discussion. In addition, each textual entry is entirely allocated within a word space. It is appreciated that data, whether binary, hexadecimal, textual or other, may span two or more words 402 and need not be as simplistic as the examples provided. It is also understood and appreciated that the exemplary data as shown reflects the state at a specific point in time. As further described below, the operations of application nodes 104 to join, send to and leave a group will alter the exemplary data.

Figure 5:
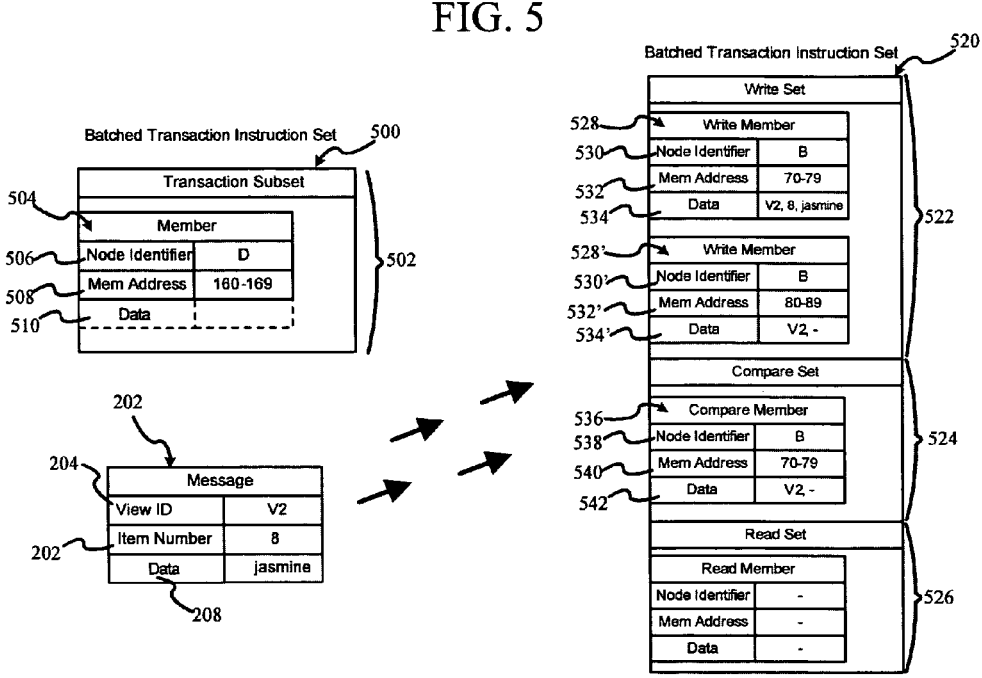
FIG. 5 illustrates an example of a batched transaction instruction set for performing a send message group communication operation in accordance with an embodiment.

FIG. 5 illustrates the structural form of a batched transaction instruction set 500 which is used to facilitate transactions within TSMS 400. The batched transaction instruction set 500 includes at least one subset 502 selected from the group consisting of a write subset, a compare subset, a read subset and combinations thereof. For each included subset there is at least one member 504 providing a valid non-null memory node identifier 506 and memory address range 508. For write and compare members, data 510 is also provided. Recalling that atomic transactions are guaranteed to have either of two outcomes—either complete execution or no trace of execution—by batching the instruction subsets 502 together so they are processed collectively, when multiple processes attempt to perform conflicting atomic transactions simultaneously, the atomic nature of each batched transaction instruction set 500 ensures that only one batched instruction set 500 will operate at a time upon a given memory address range, and that the batched transactions set 500 are serializable, meaning that they appear to execute one after the other without intermingling.

In at least one alternative embodiment, the structure of a batched transaction instruction set 520 is pre-established to provide a shell structure for a write subset 522, a compare subset 524 and a read subset 526, into which valid members are added. A non-valid member is one having null for the memory address and memory address range, which effectively results in an empty subset. Use of the pre-defined shell structure may in certain embodiments be advantageous in reducing overhead for the assembly of batched transaction instruction set 500.

In at least one embodiment the predefined shell structure of batched instruction set 520 is used in transaction operation performing the core of send message 202, which desires to add a new message "jasmine" as part of the view identified by view id "V2" as message item number "8". Again, it is understood and appreciated that the example data provided has been simplified for ease of discussion and illustration. The true nature of the message data may be of course range from a simple value or textual word to a string of elements or even more complex data structures.

For GCM 100, the application node 102 members of the group assemble messages with the relevant subsets selected from send, join, leave and read. The transaction elements to accomplish these message communications are translated through TSMS 400 so as to identify the relevant memory node or nodes providing the involved portion of the memory queue 112.

Moreover, as shown message 202 is transparently converted by GCM 100 into batched transaction 520. Specifically, the write subset 522 has at least one write member 528 specifying a memory node identifier 530, a memory address range 532 and write data 534. The compare subset 524 has at least one compare member 536 specifying a memory node identifier 538, a memory address range 540 and compare data 542. A read subset 526 is also provided, but may be unused for the purposes of the send message operation.

As shown, and for example purposes further described below, batched transaction 520 provides two write members, 528, and 528'. Specifically write member 528 provides data 534 that will be written into the current end of the message queue, and write member 528' that provides data that identifies the new end of the message queue.

The adoption of the three tier structure for the batched transaction instruction set 520 advantageously simplifies the programming overhead for both the assembly of the batched transaction instruction set 520 and the interpretation of the batched transaction instruction set 520 by the memory nodes 104. Further, the three tiered structure advantageously achieves atomic execution by collectively providing the valid members to the transactional memory system.

With respect to the example batched transaction instruction set 520, as shown to represent message 202, a valid write member 528 and a valid compare member 536 are shown. Compare member 536 is populated with a node identifier 538, a memory address range 540 and data 542. Likewise, write member 528 is populated with a node identifier 530, a memory address range 532 and data 534.

Simply stated, this batched transaction instruction set 520 directs memory node B (104B) to compare the memory address 70-79 for empty data "V2, -", and directs memory node B (104B) to write the memory address 70-79 with the data "V2, 8, jasmine". The write operation is contingent upon a positive evaluation of the compare member 536.

If memory address 70-79 is not evaluated as containing empty data, in at least one embodiment, an automated incremental process is engaged to advance the send message 202 to the next item number, i.e., "9". The incremental process will continue—comparing the data in each message slot until an empty slot is found and the write operation may be executed. This repetitive operation is performed automatically as described in the details of the send operation discussed below.

Upon receipt of the batched transaction instruction set 520 by the specified memory node 104, memory node 104B acts to safeguard the memory address range specified in the relevant transaction members. In at least one embodiment, the safeguard is achieved by establishing a lock upon the specified memory address range. This safeguard is imposed upon the memory address range for the duration of the execution of the batched transaction instruction set 520.

FIGS. 6~10 provide flow diagrams illustrating message communication within a network environment, such as that shown and described with respect to FIGS. 1~5, in accordance with at least one embodiment. It will be appreciated that the described method need not be performed in the order in which it is herein described, but that this description is merely exemplary of one method of performing group communication in accordance with at least one embodiment.

Figure 6:
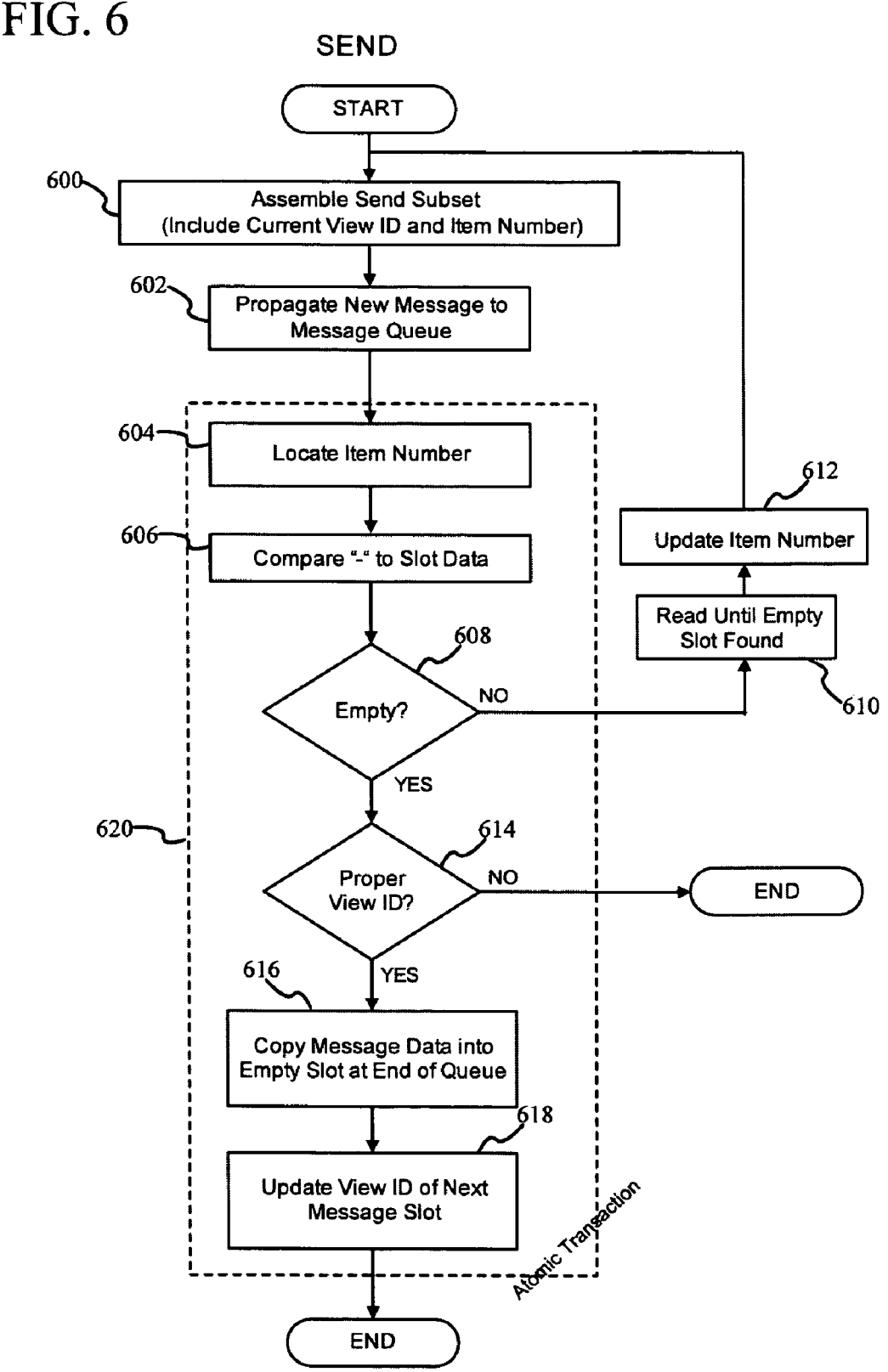
FIG. 6 is a flow diagram of a send operation in accordance with at least one embodiment.

FIG. 6 illustrates an embodiment for performing a send message in GCS 100. As shown in FIG. 6, an application node, such as application node 102A, commences assembly of the send message subset, block 600. Application node 102A not only maintains for itself locally a record of the last message read from the queue, but it also maintains a local record of the last message added to the queue. Application node 102A therefore starts from the last message added and the assumption that the next message space is free. If the next message space is not free, the transaction will fail and the application node 102A will try again, as further described below.

In at least one embodiment, the assembly of the send message subset, block 600, results in a batched transaction set 520. The assembled send message subset is propagated to the memory queue, block 602. The send message subset of instructions directs the operation to consider the memory queue at the location based on the specified message item number, block 604, and an evaluation is performed to determine if that message slot is empty. In at least one embodiment, such as TSMS shown in FIG. 5, the end of the message list is determined by considering the specified item number and performing a compare operation to determine if the message slot is empty, block 606. With respect to FIGS. 4, 5 and 6 emptiness is indicated by a dash, e.g. "-". It is possible that due to network issues or the posting of new messages which application node 102A has not read, that the end of the message queue has moved.

If the message slot is not empty, decision 608, the batched transaction is aborted and application node 102A commences reading messages until the end is found, block 610. With the new end located, the item number is updated, 612, and a new batched transaction incorporating the new item number is assembled and propagated once again, blocks 600, 602. If the message slot is empty, decision 608, the operation continues.

In at least one embodiment, when a message is added to the queue, the view id of the next message slot is also updated to reflect the latest view id. As such, the send message instruction set dispatched by application node 102A will compare the view id value of the empty message slot before adding the new message. The new message will only be added if a comparison of the view id is confirmed as positive, decision 614 and block 616. If the message is indeed added, the view id of the next message location is updated with the same view id, block 618. In the example of batched transaction 520, this view id update is accomplished with write member 528', shown to write "V2-", indicating view id #2, and blank data.

So as to ensure that the process of locating the end and adding the new message are accomplished without interruption, the operations of blocks 604, 606, 608, 614, 616 and 618 are performed as an atomic transaction, as is illustrated by dashed line 620.

It is understood and appreciated that in executing the send message subset of instructions, the application node, e.g., application node 102A, is interacting with the memory nodes implementing message queue, but not other application nodes, or the metadata. More specifically, the send message subset of instructions executes as a direct action performed by an application node interacting with the message queue. As such, application node 102A is participating in group communication without imposing upon the resource or processing activities of the other application node members of the group.

Figure 7:
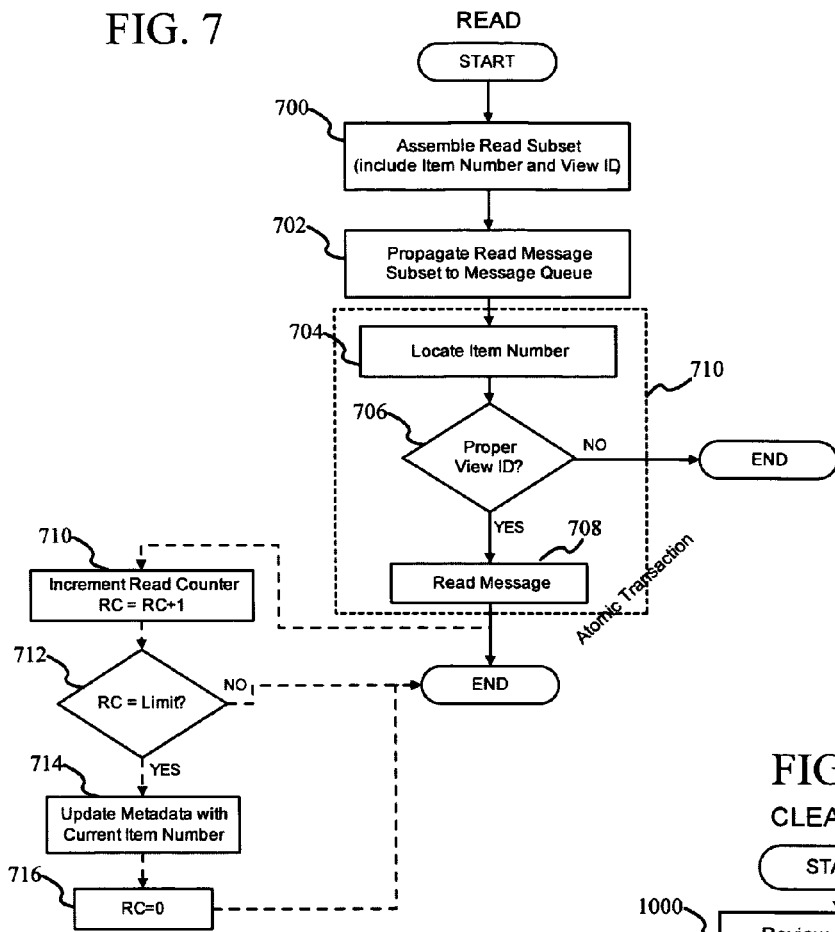
FIG. 7 is a flow diagram of a read operation in accordance with at least one embodiment.

FIG. 7 illustrates an embodiment for performing a read message subset of instructions in GCS 100. As shown in FIG. 7, an application node, such as application node 102A, commences assembly of the read message subset, block 700. As stated above, application node 102A maintains for itself locally a record of the item number of the last message read from the queue. In addition, the application node 102A has a local record of the view id it considers current.

The assembled read message subset is then executed to propagate to the message queue, block 702. Upon receipt, the specified message is located based on the item number, block 704. Before performing the read operation, a comparison of the view id is performed to ensure that the application node is entitled to read the message data, decision 706. If the evaluation of the view id is positive, the read operation is executed and the message data returned to the application node, block 708. In at least one embodiment the operations of blocks 704, 706 and 708 are performed as an atomic transaction, as illustrated by dotted line 710.

In at least one embodiment, the application node 102A will maintain a simple counter incremented with each successive read operation. At periodic intervals, a tunable parameter, application node 102A will update the metadata to reflect the item number of the last read message, decision 708. More specifically, as shown in optional block 710, a read counter RC is incremented. The read counter is evaluated against a limit, decision 712. If the limit is reached, the metadata indicator for the application node's most recent read message is updated, block 714, and the read value is reset 716.

With respect to the optional update of the read counter, it is understood and appreciated that this process is not an element of the read message transaction. In at least one embodiment it is a process that occurs after and separately from the read message transaction. Moreover, it is shown in connection with the read transaction of FIG. 7 so as to provide context.

As with the send message operation, it is understood and appreciated that the application node, e.g., application node 102A, is interacting with the message queue, but not the other application nodes, or the metadata for the purpose of reading a message. As such, application node 102A is participating in group communication without imposing upon the resource or processing activities of the other application node members of the group.

Figure 8:
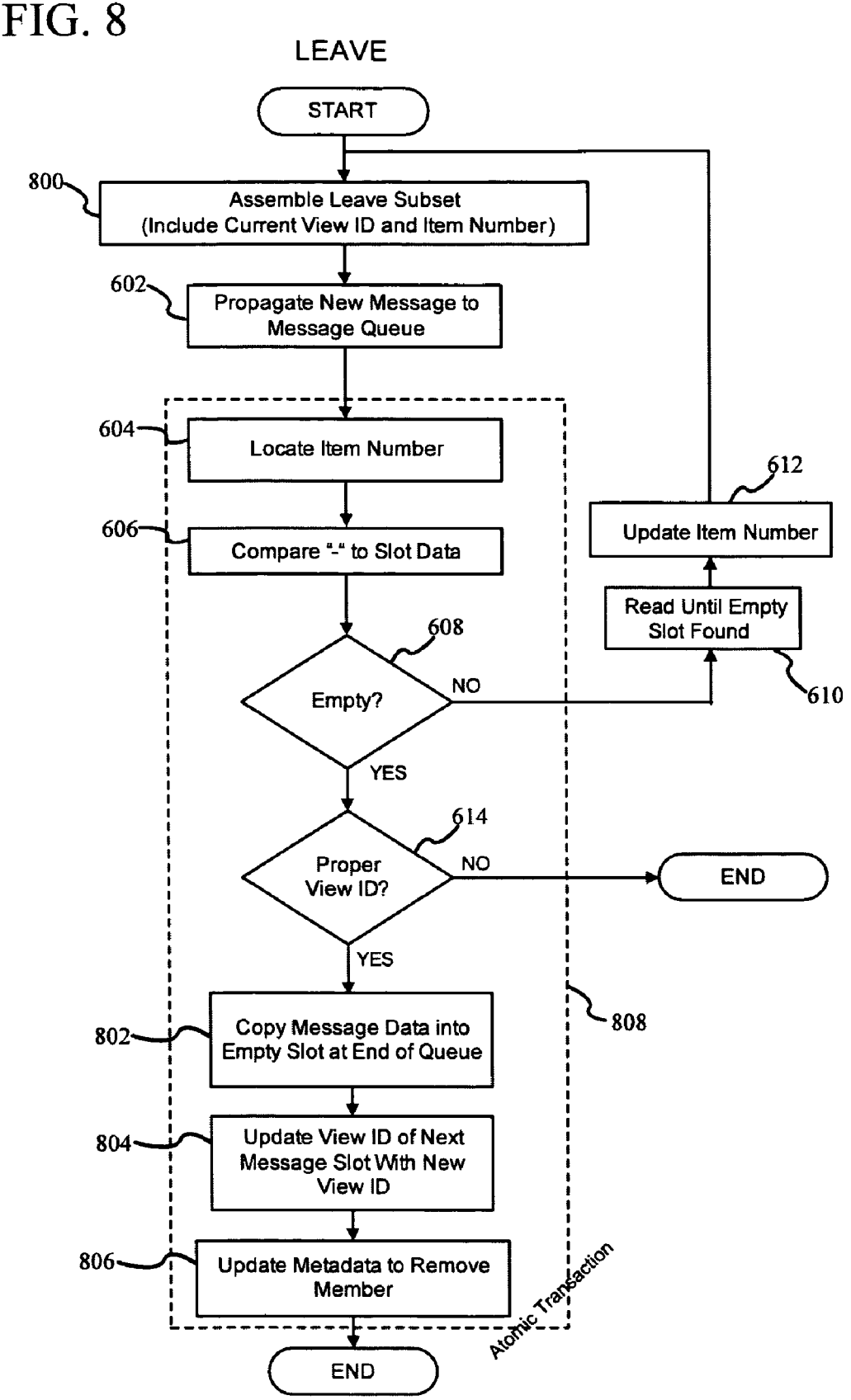
FIG. 8 is a flow diagram of a leave operation in accordance with at least one embodiment.

FIG. 8 illustrates an embodiment for performing a leave message operation. As shown, an application node, such as application node 102A, commences assembly of the leave message subset, block 800. The application node 102 has a locally maintained record of the view id and the message item number of last message read from the queue, both of which are included elements in the leave message subset.

The leave message is very similar to the send message operation, e.g., actions 602 through 614. As the group membership is now changed, in at least one embodiment the leave message text added (block 802) as the message data informs the remaining members of the group of the new view id. The new view id is also added to the next message space, block 804.

In addition to adding a message to the queue that an application node is leaving, an update is made to the metadata to remove the leaving application node from the membership group, block 806. In at least one embodiment, the operations of blocks 604, 606, 608, 614, 802, 804 and 806 are performed as an atomic transaction, as is illustrated by dashed line 808.

It is understood that the leave message may be added by the application that is actually leaving, e.g., application node 102A, or it may be added on behalf of an application node, such as for example an application node that has hung or been disconnected. Again, the leave message operation is a direct action performed by an application node interacting with the message queue. As such, the application node is participating in group communication without imposing upon the resource or processing activities of the other application node members of the group.

Figure 9:
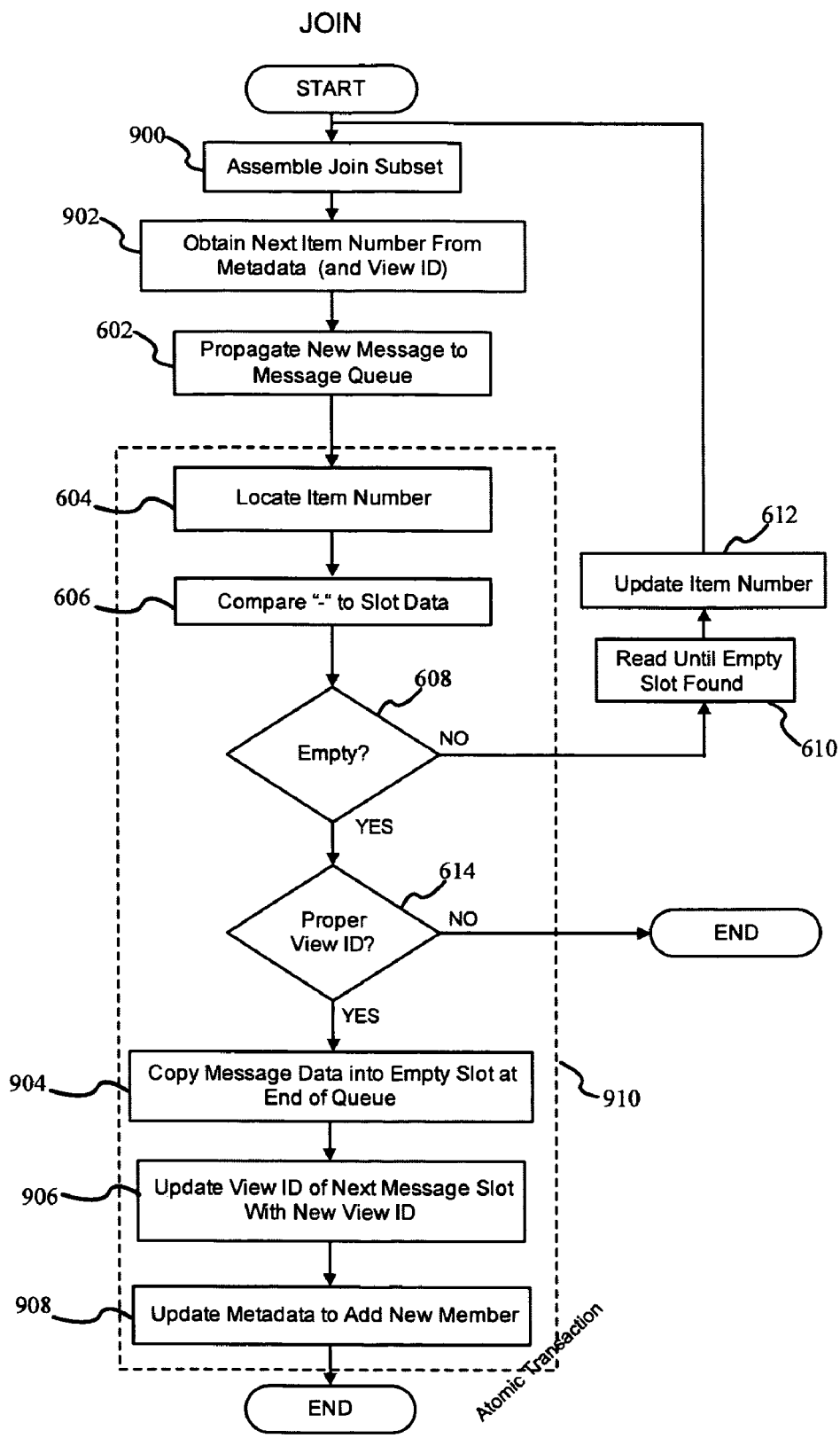
FIG. 9 is a flow diagram of a join operation in accordance with at least one embodiment.

FIG. 9 illustrates an embodiment for performing a join message operation. As shown, an application node, such as application node 102A, commences assembly of the join message subset, block 900. So as to determine the proper location for adding the join message, in at least one embodiment the application node queries the metadata to determine the highest bound for the most recent message read by a member of the group and may also obtain the latest view id, block 902.

As with the leave message operation, FIG. 8, the join message operation is very similar to the send message, e.g., actions 602 through 614. As an application node is joining, the view of the group membership is going to change as well.

The view id, whether read from the metadata or the located empty message slot, is incremented and included in the added message text announcing the joining of the application node, block 904. This new view id is also written to the next message space, block 906. In addition, the metadata is updated to reflect the newly added application node as a member of the group, block 908. In at least one embodiment, the operations of blocks 604, 606, 608, 614, 904, 906 and 908 are performed as an atomic transaction, as is illustrated by dashed line 910.

As with the leave message operation, the join message may be added by the application node that is actually joining, e.g., application node 102A, or it may be added on behalf of an application node that is joining. Again, it is to be appreciated that the join message is provided by an application node participating in group communication without imposing upon the resource or processing activities of the other application node members of the group.

The atomic execution of the send message, join message and leave message subsets of instructions establishes the messages in a total order that is identical for all application nodes retrieving read messages from the message queue.

As noted above, in at least one embodiment, the message queue is a circular message queue. As such, in an effort to add a message in accordance with a send, join or leave subset of instructions, an available space in the message queue may not be found. In such an instance GCS 100 permits the application node to engage in a cleanup operation.

Figure 10:
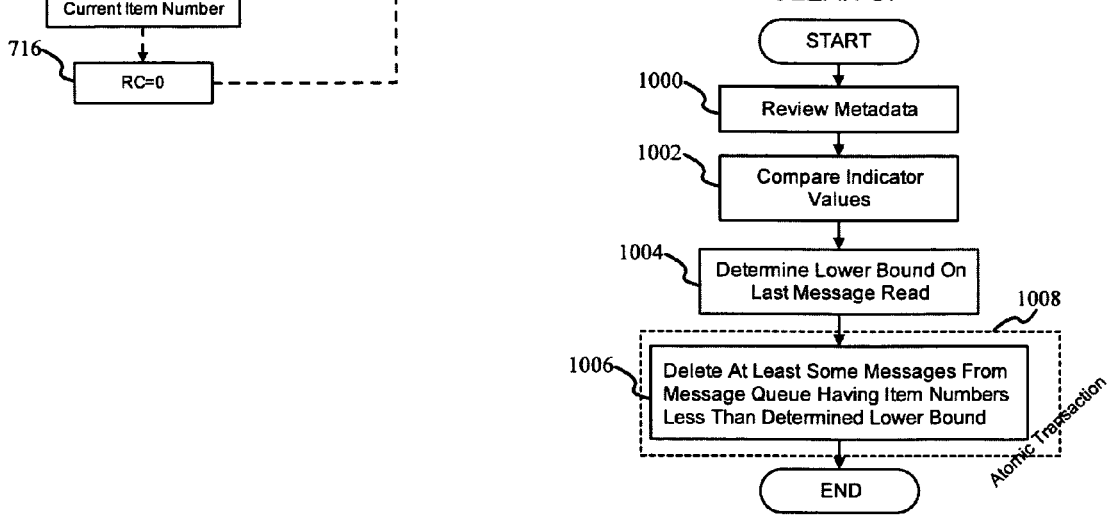
FIG. 10 is a flow diagram of a cleanup operation in accordance with at least one embodiment.

FIG. 10 illustrates an embodiment for performing a cleanup operation in GCS 100. The cleanup operation, whether engaged as a periodic maintenance operation or in response to an attempt to add a message to the message queue finding no free message spaces, commences in at least one embodiment with a review of the metadata, block 1000.

Specifically, the indicator values for each member of the group are compared, block 1002. As each indicator represents the lower bound of the last message item read, through the compare process the lower bound on the last message read by all group members is determined, block 1004. As each application node periodically updates its indicator value it is possible that one or more application nodes have read beyond the indicator value; however, the determined lower bound for the group is still the lower bound for the group.

The cleanup operation then directs the deletion of some if not all items in the message queue having item numbers less than the message of the determined lower bound, block 1006. In at least one embodiment the deletion process of block 1006 is performed as an atomic transaction, as indicated by dotted line 1008. If the cleanup operation was engaged during add message operation (e.g., a send, join or leave subset of instructions), that add message operation may then be re-initiated.

As in the add message or read message operations, the cleanup operation can remove messages from the message queue without imposing upon the resources or processing activities of the other application node members of the group.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A group communication system, comprising
   a plurality of discrete application nodes;
   at least one memory node providing a shared memory, the shared memory providing a message queue;
   a network interconnecting the plurality of discrete application nodes and the at least one memory node, such that the message queue is available to the application nodes; and
   a communication controller for directing communication transactions between a group established by at least a subset of the plurality of discrete application nodes using the shared memory, the communication controller to provide to the application nodes a code library operable to permit a first application node to assemble a communication instruction set including instruction subsets selected from a group consisting of a send message subset, a join message subset, a read message subset, and a leave message subset, wherein at least the send, join, read and leave message subsets are executable atomically;
   wherein message to be added to the message queue includes a view identifier identifying a view of the group membership as of the adding of the message.

2. The system of claim 1, wherein the send message subset is operable to permit the first application node to add a message to the queue for all members of a group of application nodes including the first application node wherein the join message subset is operable to permit the first application node to add a join message to the queue for all members of a group of application nodes wherein the leave message subset is operable to permit an application node to add a leave message to the queue for all members of a group of application nodes from which an application node is Leaving and wherein the read message subset is operable to permit a second application node to read from the queue any message added to the queue by the first application node of a group including the second application node.

3. The system of claim 2, wherein the first application node and the second application node are the same application node.

4. The system of claim 2, wherein the first application node is to add messages to the message queue, the added messages to passively await retrieval by at least one second application node, operable through the communication controller to execute at least one read message subset.

5. The system of claim 1, wherein a plurality of memory nodes provide the shared memory, the queue spanning at least two memory nodes.

6. The system of claim 1, wherein the queue is a circular queue.

7. The system of claim 1, wherein the messages in the queue have unique sequential item numbers, and the shared memory is to further provide group membership metadata, the group membership metadata identifying each current member of the group and an indicator for each group member approximating a lower bound of a last message item number read from the queue.

8. A method of group communication in a system environment with a plurality of discrete application nodes networked with at least one discrete memory node establishing a shared memory providing a message queue, comprising:
   providing a code library at a first application node that is part of the plurality of discrete application nodes. wherein the code library is operable to permit the first application node to assemble a communication instruction set including instruction subsets selected from the group consisting of:
      a send message subset permitting the first application node to add a message to the message queue for all members of a group of application nodes including the first application node;
      a join message subset permitting the first application node to add a join message to the message queue for all members of a group of application nodes;
      a leave message subset permitting the first application node to add a leave message to the message queue for all members of a group of application nodes from which the first application node is leaving;
      a read message subset permitting the first application node to read from the message queue any message added to the queue by another application node of a group including the first application node;
      wherein at least the send, join, read and leave message subset are executed atomically; and
   propagating the send message subset, the join message subset or the leave message subset from the first application node to the message queue and adding a corresponding message to the message queue, the message including a view identifier indicating a view of the group membership as of the adding of the message.

9. The method of claim 8, wherein a plurality of memory nodes provide the shared memory, the queue spanning at least two memory nodes.

10. The method of claim 8. wherein the queue is a circular queue.

11. The method of claim 8, wherein the atomic execution of the send message, join message and leave message subsets establish the messages in a total order the same for all application nodes propagating read message subsets to the message queue.

12. The method of claim 8, wherein each application node maintains for itself an indicator indicating a last message read from the queue by the application node.

13. The method of claim 8, wherein the messages in the message queue have unique sequential item numbers, and the shared memory further provides group membership metadata, the group membership metadata identifying each current member of the group and an indicator for each group member approximating a lower bound of a last message item number read from the queue.

14. The method of claim 13, wherein the method further includes a cleanup operation, the cleanup operation comprising:
- reviewing the indicator values in the group membership metadata of the last messages read to determine a lower hound on the last message read by all application node members of the group; and
- removing messages from the queue having item numbers less than the determined latest message.

15. The method of claim 8, wherein the method is stored on a computer-readable medium as a computer program which, when executed in a computer network having a plurality of application nodes and plurality of memory nodes in networked communication, will perform the method of directing group communication.

16. A computer readable medium on which is stored a computer program for directing group communication in a system environment having a plurality of discrete application nodes networked with at least one memory node providing a shared memory having a queue and group membership metadata, the computer program executable on at least one computer, and the computer program comprising:
- a send message routine permitting a first application node to add a message to the queue within the shared memory for all members of a group of application nodes including the first application node;
- a join message routine permitting the first application node to add a join message to the queue for all members of a group of application nodes, and to update the group membership metadata to include the first application node;
- a read message routine permitting the first application node to atomically read from the queue any message added to the queue by another application node of a group including the first application node, and to record a new indicator for the last message read by the first application node, the read message routine to further update the group membership metadata at periodic intervals to set an indicator reflecting a lower bound of the last message item number read from the queue;
- a leave message routine permitting the first application node to add a leave message to the queue for all members of a group of application nodes from which the first application node is leaving, and to update the group membership metadata to remove the first application node; and
- a cleanup routine to periodically operate to determine from the group membership metadata a lower bound for the last message read by all group members and to remove from the queue all messages having item numbers less than the determined lower bound.

17. The computer readable medium of claim 16, wherein each message includes a view identifier indicating a view of the group membership as of the adding of the message.

18. The computer readable medium of claim 16, wherein the established queue spans at least two memory nodes.

19. The method of claim 8, further comprising:
- propagating the read message subset from the first application node to the message queue and retrieving at least one new message having a view identifier indicating a view of the group membership as of the adding of the message.

* * * * *

UNITED STATES PATENT AND TRADEMARK OFFICE
CERTIFICATE OF CORRECTION

PATENT NO. : 7,609,703 B2  Page 1 of 1
APPLICATION NO. : 11/522151
DATED : October 27, 2009
INVENTOR(S) : Mehul A. Shah et al.

It is certified that error appears in the above-identified patent and that said Letters Patent is hereby corrected as shown below:

In column 13, line 45, in Claim 1, after "wherein" insert -- a --.

In column 14, line 20, in Claim 8, delete "nodes." and insert -- nodes, --, therefor.

In column 14, line 41, in Claim 8, delete "subset" and insert -- subsets --, therefor.

In column 14, line 51, in Claim 10, delete "claim 8." and insert -- claim 8, --, therefor.

In column 15, line 6, in Claim 14, delete "hound" and insert -- bound --, therefor.

Signed and Sealed this

Thirty-first Day of August, 2010

David J. Kappos
*Director of the United States Patent and Trademark Office*